United States Patent [19]

Kimura et al.

[11] Patent Number: 4,950,062
[45] Date of Patent: Aug. 21, 1990

[54] PROJECTION LENS

[75] Inventors: Yuichi Kimura, Higashiosaka; Yoshiharu Yamamoto, Toyonaka; Masayuki Takahashi, Ibaraki, all of Japan

[73] Assignee: Matsushita Electric Industrial Co., Ltd., Kadoma, Japan

[21] Appl. No.: 139,452

[22] Filed: Dec. 30, 1987

[30] Foreign Application Priority Data

Mar. 31, 1987 [JP] Japan ................................. 62-77716

[51] Int. Cl.$^5$ ............................................ G02B 13/18
[52] U.S. Cl. ..................................... 350/432; 350/412
[58] Field of Search ............... 350/432, 433, 434, 435, 350/412

[56] References Cited

U.S. PATENT DOCUMENTS

| | | | |
|---|---|---|---|
| 3,429,997 | 2/1969 | Rosner et al. | 350/412 X |
| 3,516,734 | 6/1970 | Schmidt | 350/412 X |
| 3,800,085 | 3/1974 | Ambats et al. | 350/432 X |
| 3,868,173 | 2/1975 | Miles et al. | 350/432 X |
| 4,300,817 | 11/1981 | Betensky | 350/412 |
| 4,348,081 | 9/1982 | Betensky | 350/412 |
| 4,530,575 | 7/1985 | Yamakawa | 350/412 |
| 4,778,264 | 10/1988 | Matsumura et al. | 350/412 X |

FOREIGN PATENT DOCUMENTS

| | | | |
|---|---|---|---|
| 58-139111 | 8/1983 | Japan | 350/412 |
| 58-198016 | 11/1983 | Japan | 350/412 |

Primary Examiner—Scott J. Sugarman
Attorney, Agent, or Firm—Wenderoth, Lind & Ponack

[57] ABSTRACT

A projection lens for projecting onto a screen an enlargement of an image appearing on a CRT wherein comma and chromatic aberration, which degrades imaging quality, can be properly corrected comprises 4 lens units. The projection lens comprises, in the order from the screen end, a first lens unit of positive optical power having a strong convex surface facing the screen end, a second lens unit comprising a biconvex lens element of positive optical power and a lens element of negative optical power having a concave surface facing the screen end, a third lens unit of positive optical power at an optical axis having a convex surface facing the screen end, and a fourth lens unit of negative optical power having a concave surface facing the screen end.

8 Claims, 9 Drawing Sheets

PROJECTION LENS

BACKGROUND OF THE INVENTION

1. Field of the Invention

The present invention relates to a projection lens, and more particularly to a projection lens used in a video projector for obtaining an enlarged picture on a screen by projecting an image appearing on a cathode ray tube (CRT).

2. Description of the Prior Art

U.S. Pat. No. 4,300,817 or U.S. Pat. No. 4,348,081 shows a basic arrangement of a projection lens, which comprises three lens units (groups). However, correction of chromatic aberration is not considered in these U.S. Patents.

A projection lens used in a video projector of the three-tube type is required for obtaining a high quality color image to have a capability of correcting chromatic aberration. A projection lens having the chromatic aberration correction capability is disclosed Japanese Laid-Open Patent Application No. 58-198016. This lens is composed of, from the screen end, a first convex lens element of bi-convex type, a meniscus convex lens elements having a concave surface directed to the screen end, and a second concave lens element. The first, second and meniscus convex lens element is made so as to have an Abbe number of 50 to 65 and the first concave lens element is made so as to have an Abbe number of 20 to 40, thereby reducing the chromatic aberration. The lens elements except for the second concave lens element are made of plastic.

Another projection lens having the chromatic aberration correction capability is disclosed in Japanese Laid-Open Patent Application No. 58-139111 or its corresponding U.S. Pat. No. 4,530,575. This lens comprises, from the screen end, a first positive lens element having a convex surface directed to the screen end, a second positive lens element, a third negative lens element, a fourth biconvex lens element made of a glass material, and a fifth negative lens element. The lens satisfies specific conditions to correct chromatic aberration.

SUMMARY OF THE INVENTION

It is an object of the invention is to provide a high-performance projection lens which can effectively correct comma and chromatic aberration to obtain a high quality projected image.

In order to achieve this object, the projection lens according to the present invention comprises, in the order from the screen end, a first lens unit of positive optical power having a strong by convex surface facing the screen end, a second lens unit comprising a biconvex lens element of positive optical power and a lens element of negative optical power having a concave surface facing the screen end, a third lens unit of positive optical power and at an optical axis having a convex surface facing the screen end, and a fourth lens unit of negative optical power having a concave surface facing the screen end. The first lens unit has at least one aspherical surface for correcting aberration depending on the aperture of the lens. The second lens unit corrects spherical aberration and chromatic aberration along the optical axis. The third lens unit has at least one aspherical surface for correcting comma and astigmatism. The fourth lens unit corrects aberration depending on the view angle, especially curvature of field and distortion.

DESCRIPTION OF THE PREFERRED EMBODIMENTS

The projection lens according to the present invention will hereafter be explained concretely in connection with the preferred embodiments.

Figure 1:
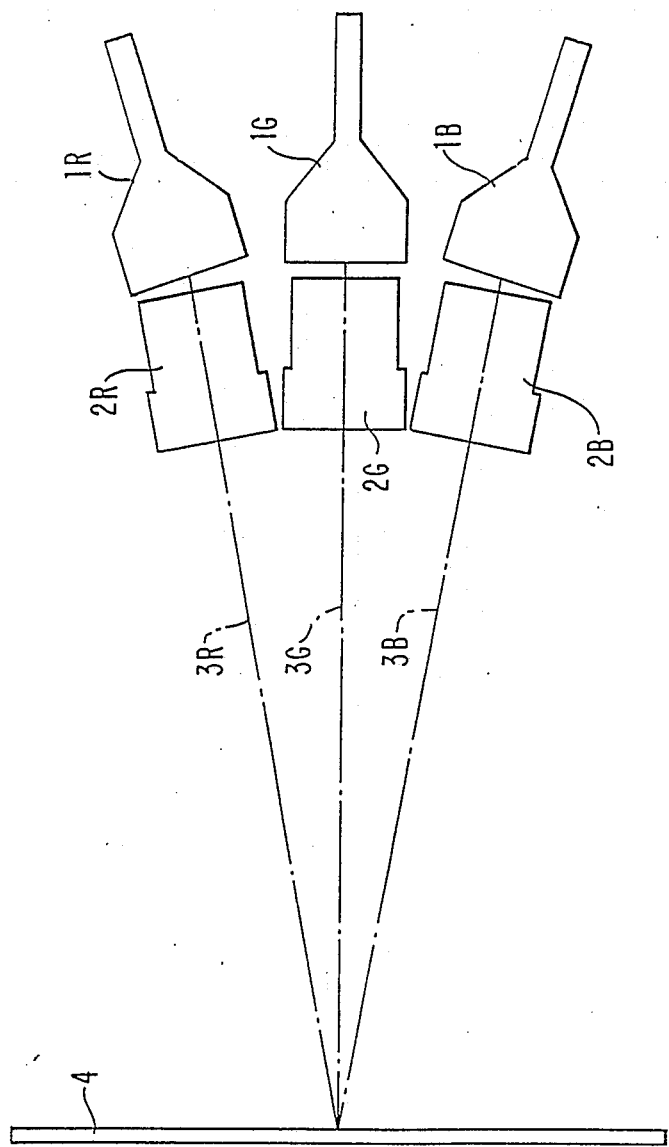
FIG. 1 is a schematic sectional view of a video projection apparatus employing a projection lens according to the present invention.

FIG. 1 is a schematic diagram showing an optical system for a television image projection apparatus to which a projection lens of the invention is applicable. This optical system uses three CRTs 1R, 1G and 1B which are red, green and blue, respectively, and three lenses 2R, 2G and 2B. The three lenses 2R, 2G and 2B are disposed on the same plane so that the optical axes 3R, 3G and 3B converge at one point on a screen 4 or in the vicinity thereof to compose a complete color image on the screen.

Figure 2:
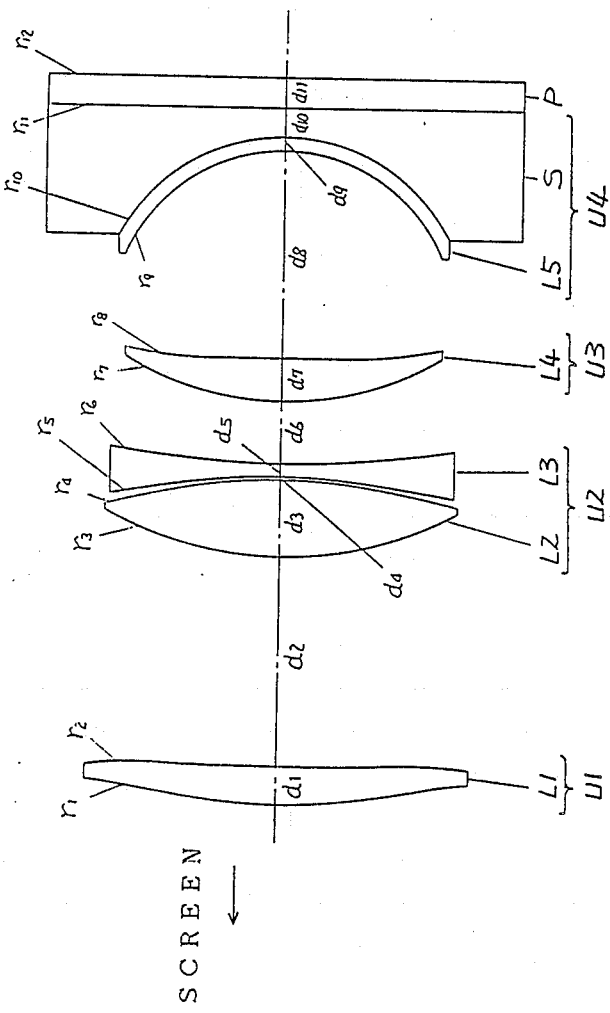
FIGS. 2 through 5 are side views respectively showing first through fourth embodiments of projection lenses according to the present invention.

A projection lens embodying the invention comprises four lens unit: U1, U2, U3 and U4 as shown in each of FIGS. 2, 3, 4 and 5. The projection lens shown in FIG. 2 comprises, in the order from the screen end, a first lens unit U1 comprising an element L1 of positive optical power, a second lens unit U2 comprising a biconvex lens element L2 of positive optical power and a lens element L3 of negative optical power, a third lens unit U3 comprising an element L4 of positive optical power at the optical axis, and a fourth lens unit U4 comprising an element L5 and a medium S for optical coupling to a CRT face plate P.

Plastic has a variation rate of the refractive index due to temperature variation which is greater by one digit relative to that of glass. Thus, if all the lens elements are composed of plastic lens elements, a variation of atmospheric temperature causes a deviation of the focal point. To alleviate this, it is preferable that the plastic lens element be used as a lens having a weak power or having a low on-axis ray height. The glass lens is preferably used as a lens having a high on-axis ray height. Therefore, the first lens unit U1 and the third lens unit U3 are composed of plastic lens elements. And the second lens unit U2 is composed of glass lens elements. In the embodiment shown in each of FIGS. 2, 3 and 4, the lens element L5 of the fourth lens unit U4 is a meniscus plastic element, which can be easily produced at low cost by conventional injection molding. Since the thickness of this element is relatively small, the influence of the variation of the thickness due to temperature variation is small. In the embodiment shown in FIG. 5, the lens element L5 of the fourth lens unit U4 is a glass element, which is hardly influenced by atmospheric temperature.

The major function of each lens unit is as follows:

The first lens unit U1 has at least one aspherical surface for correcting aberration depending on the aperture of the lens. The second lens unit U2 corrects spherical aberration and chromatic aberration along the optical axis. The third lens unit U3 has at least one aspeherical surface for correcting comma and astigmatism. The fourth lens unit U4 corrects aberration depending on view angle, especially curvature of field and distortion.

The above described features of the projection lens according to the present invention can be improved further by satisfying the following conditions.

$$f_{2P} \cdot \nu_{2P} / f_{2N} \cdot \nu_{2N} < -0.69 \quad (1)$$

$$0.10 < d_{23}/f < 0.15 \quad (2)$$

where f: focal length of the overall lens system $f_{2P}$: focal length of the lens element of positive optical power in the second lens unit $f_{2N}$: focal length of the lens element of negative optical power in the second lens unit $\nu_{2P}$: Abbe's number of the lens element of positive optical power in the second lens unit $\nu_{2N}$: Abbe's number of the lens element of negative optical power in the second lens unit $d_{23}$: distance between the second lens unit and the third lens unit The condition (1) relates to power and Abbe's number of the positive power lens element and the negative power lens element composing the second lens unit to correct chromatic aberration. When the limit of condition (1) is exceeded, the chromatic aberration along the optical axis becomes too large to properly correct chromatic aberration.

The condition (2) relates to the distance between the second lens unit and the third lens unit. When the lower limit of condition (2) is exceeded, the height of the on-axis light ray of the third lens unit becomes greater so that the variation of the focal point caused by changes in atmospheric temperature becomes greater. When the upper limit of condition (2) is exceeded, it becomes difficult to correct coma which deteriorates constrast.

When the focal length of the first lens unit is $f_1$ and the distance between the first lens unit and the second lens unit is $d_{12}$, it is preferable to satisfy the following condition:

$$d_{12}/f_1 < 0.2 \quad (3)$$

When the limit of condition (3) is exceeded, a chromatic aberration generated at the first lens unit becomes excessive, so that the correction thereof with the second lens unit becomes difficult.

The specific design values of the first through fourth embodiments respectively shown in FIGS. 2 through 5 are shown below, in which $r_1$, $r_2$, $r_3$ ... represent radii of curvature of surfaces of lens elements disposed from the screen end; $d_1$, $d_2$, $d_3$ ... represent center thicknesses of the lens elements and distances therebetween; $n_1$, $n_2$, $n_3$ ... represent refractive indices at a wave length $\lambda = 546$ nm of the lens elements; $\nu_1$, $\nu_2$, $\nu_3$ ... represent Abbe's number at the wave length $\lambda = 546$ nm of the lens elements.

The shape of each aspheric surface in a Cartesian coordinate system with the direction of the optical axis being the X axis (the Y axis is perpendicular to the X axis), is an aspheric surface of rotating symmetry expressed by the following formula:

$$X = \frac{CP^2}{1 + \sqrt{1 - (1+K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, and AD, AE, AF, AG are higher dimension constants.

| First embodiment (FIG. 2) |
| --- |
| Focal length f = 136.9, Field angle 45°, F1.3, $f_{2P} \cdot \nu_{2P}/f_{2N} \cdot \nu_{2N} = -1.09$, $d_{23} = d_6$, $d_{23}/f = 0.146$, $d_{12} = d_2$, $d_{12}/f_1 = 0.161$ |

| | | | |
| --- | --- | --- | --- |
| $r_1 = 179.293$ | $d_1 = 13.00$ | $n_1 = 1.493834$ | $\nu_1 = 56.9$ |
| $r_2 = 1145.071$ | $d_2 = 69.12$ | $n_2 = 1.0$ | |
| $r_3 = 114.744$ | $d_3 = 27.00$ | $n_3 = 1.5818253$ | $\nu_2 = 64.0$ |
| $r_4 = -190.183$ | $d_4 = 0.65$ | $n_4 = 1.0$ | |
| $r_5 = -259.096$ | $d_5 = 4.80$ | $n_5 = 1.624084$ | $\nu_3 = 36.1$ |
| $r_6 = 329.668$ | $d_6 = 20.00$ | $n_6 = 1.0$ | |
| $r_7 = 129.605$ | $d_7 = 15.00$ | $n_7 = 1.493834$ | $\nu_4 = 56.9$ |
| $r_8 = -1238.692$ | $d_8 = 68.62$ | $n_8 = 1.0$ | |
| $r_9 = -54.366$ | $d_9 = 5.00$ | $n_9 = 1.493834$ | $\nu_5 = 56.9$ |
| $r_{10} = -60.000$ | $d_{10} = 8.95$ | $n_{10} = 1.400000$ | |
| $r_{11} = \infty$ | $d_{11} = 15.00$ | $n_{11} = 1.540000$ | |
| $r_{12} = \infty$ | | | |

| aspherical surfaces | | | | |
| --- | --- | --- | --- | --- |
| | 1st surface | 2nd surface | 7th surface | 8th surface | 9th surface |
| K | $-4.09552$ | $219.798$ | $3.52227$ | $-329.552$ | $-0.129981$ |
| AD | $-2.36725 \times 10^{-8}$ | $-4.88877 \times 10^{-8}$ | $7.98589 \times 10^{-8}$ | $3.93128 \times 10^{-7}$ | $-9.55362 \times 10^{-7}$ |
| AE | $-1.86977 \times 10^{-11}$ | $-2.13160 \times 10^{-11}$ | $1.53595 \times 10^{-11}$ | $4.20446 \times 10^{-11}$ | $3.26460 \times 10^{-10}$ |
| AF | $-1.76004 \times 10^{-15}$ | $-2.61011 \times 10^{-16}$ | $-6.46760 \times 10^{-15}$ | $-6.53621 \times 10^{-15}$ | $-2.31463 \times 10^{-14}$ |
| AG | $-2.26308 \times 10^{-19}$ | $-2.98844 \times 10^{-19}$ | $5.80399 \times 10^{-18}$ | $7.46446 \times 10^{-18}$ | $-7.77418 \times 10^{-18}$ |

| Second embodiment (FIG. 3) |
| --- |
| Focal length f = 135.00, Field angle 45°, F1.3, $f_{2P} \cdot \nu_{2P}/f_{2N} \cdot \nu_{2N} = -1.21$, |

-continued

Figure 3:
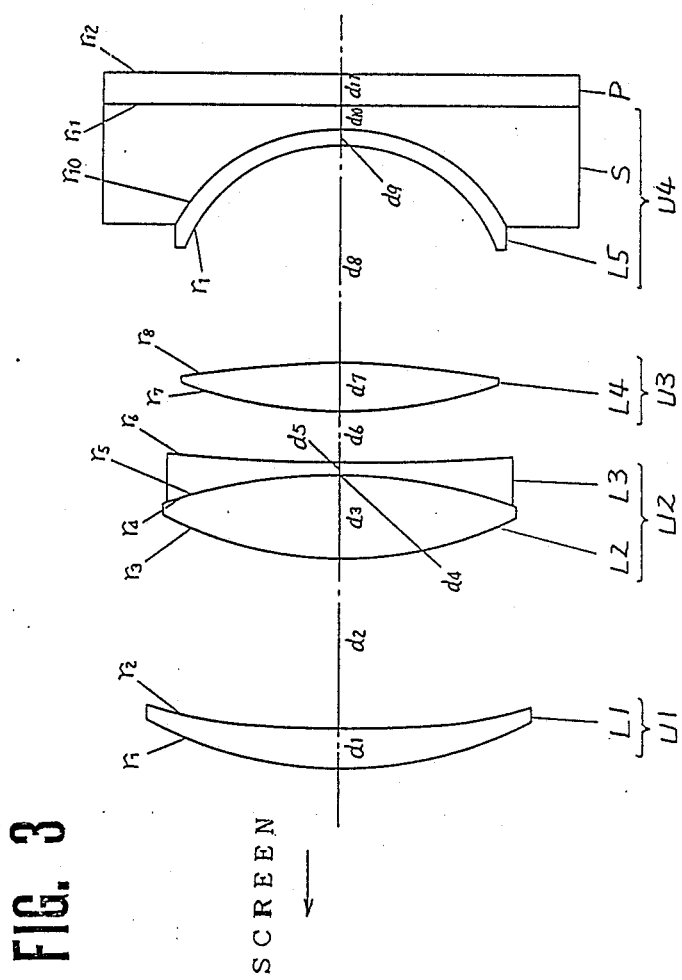

Second embodiment (FIG. 3)

$d_{23} = d_6$, $d_{23}/f = 0.121$, $d_{12} = d_2$, $d_{12}/f_1 = 0.133$

| | | | |
|---|---|---|---|
| $r_1 = 142.525$ | $d_1 = 13.20$ | $n_1 = 1.493834$ | $\nu_1 = 56.9$ |
| $r_2 = 434.415$ | $d_2 = 56.25$ | $n_2 = 1.0$ | |
| $r_3 = 131.980$ | $d_3 = 26.50$ | $n_3 = 1.5818253$ | $\nu_2 = 64.0$ |
| $r_4 = -177.338$ | $d_4 = 0.50$ | $n_4 = 1.0$ | |
| $r_5 = -169.475$ | $d_5 = 4.80$ | $n_5 = 1.624084$ | $\nu_3 = 36.1$ |
| $r_6 = 726.239$ | $d_6 = 16.30$ | $n_6 = 1.0$ | |
| $r_7 = 182.769$ | $d_7 = 16.30$ | $n_7 = 1.493834$ | $\nu_4 = 56.9$ |
| $r_8 = -215.972$ | $d_8 = 75.01$ | $n_8 = 1.0$ | |
| $r_9 = -52.111$ | $d_9 = 5.00$ | $n_9 = 1.493834$ | $\nu_5 = 56.9$ |
| $r_{10} = -61.111$ | $d_{10} = 9.00$ | $n_{10} = 1.400000$ | |
| $r_{11} = \infty$ | $d_{11} = 10.40$ | $n_{11} = 1.540000$ | |
| $r_{12} = \infty$ | | | | aspherical surfaces

| | 1st surface | 2nd surface | 7th surface | 8th surface | 9th surface |
|---|---|---|---|---|---|
| K | $-6.89418 \times 10^{-1}$ | 0.0 | 3.34565 | 0.0 | $-0.521866$ |
| AD | $4.69642 \times 10^{-8}$ | $1.04113 \times 10^{-7}$ | $4.28321 \times 10^{-8}$ | $1.50827 \times 10^{-7}$ | $-1.37984 \times 10^{-6}$ |
| AE | $-3.39527 \times 10^{-12}$ | $8.82672 \times 10^{-12}$ | $5.99839 \times 10^{-11}$ | $7.09977 \times 10^{-11}$ | $4.65791 \times 10^{-10}$ |
| AF | $4.58348 \times 10^{-15}$ | $1.89312 \times 10^{-15}$ | $2.13308 \times 10^{-15}$ | $-9.03071 \times 10^{-15}$ | $-1.31671 \times 10^{-13}$ |
| AG | $1.88991 \times 10^{-19}$ | $4.80433 \times 10^{-19}$ | $-4.03161 \times 10^{-18}$ | $-3.06209 \times 10^{-18}$ | $4.80722 \times 10^{-18}$ |

Figure 4:
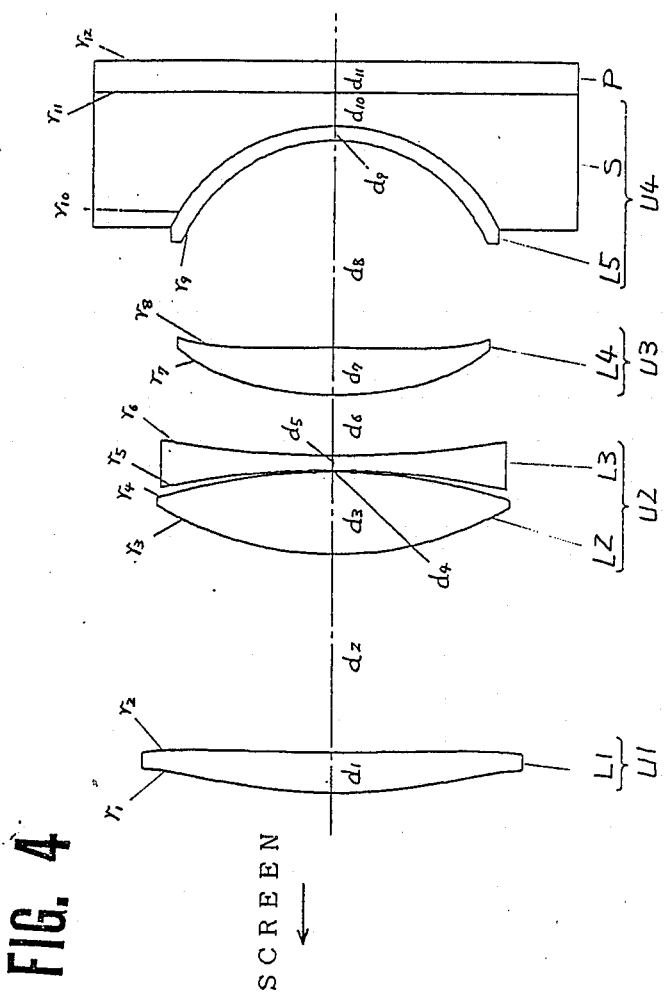

Third embodiment (FIG. 4)

Focal length $f = 135.8$, Field angle 45°, F1.3,
$f_{2P}\cdot\nu_{2P}/f_{2N}\cdot\nu_{2N} = -1.04$,
$d_{23} = d_6$, $d_{23}/f = 0.147$, $d_{12} = d_2$, $d_{12}/f_1 = 0.151$

| | | | |
|---|---|---|---|
| $r_1 = 182.566$ | $d_1 = 13.00$ | $n_1 = 1.493834$ | $\nu_1 = 56.9$ |
| $r_2 = 1150.616$ | $d_2 = 65.98$ | $n_2 = 1.0$ | |
| $r_3 = 119.259$ | $d_3 = 27.00$ | $n_3 = 1.518253$ | $\nu_2 = 64.0$ |
| $r_4 = -188.291$ | $d_4 = 0.63$ | $n_4 = 1.0$ | |
| $r_5 = -263.246$ | $d_5 = 4.80$ | $n_5 = 1.624084$ | $\nu_3 = 36.1$ |
| $r_6 = 349.810$ | $d_6 = 20.0$ | $n_6 = 1.0$ | |
| $r_7 = 127.710$ | $d_7 = 15.30$ | $n_7 = 1.493834$ | $\nu_4 = 56.9$ |
| $r_8 = -1148.490$ | $d_8 = 69.25$ | $n_8 = 1.0$ | |
| $r_9 = -55.638$ | $d_9 = 5.00$ | $n_9 = 1.493834$ | $\nu_5 = 56.9$ |
| $r_{10} = -60.000$ | $d_{10} = 11.76$ | $n_{10} = 1.400000$ | |
| $r_{11} = \infty$ | $d_{11} = 10.40$ | $n_{11} = 1.540000$ | |
| $r_{12} = \infty$ | | | | aspherical surface

| | 1st surface | 2nd surface | 7th surface | 8th surface | 9th surface |
|---|---|---|---|---|---|
| K | $-5.08789$ | 195.225 | 3.54090 | $-290.282$ | $-9.03765 \times 10^{-2}$ |
| AD | $-2.82412 \times 10^{-8}$ | $-6.67435 \times 10^{-8}$ | $7.19186 \times 10^{-8}$ | $3.81014 \times 10^{-7}$ | $-1.09203 \times 10^{-6}$ |
| AE | $-1.91102 \times 10^{-11}$ | $-1.86886 \times 10^{-11}$ | $1.31845 \times 10^{-11}$ | $4.34700 \times 10^{-11}$ | $3.53853 \times 10^{-10}$ |
| AF | $-1.86590 \times 10^{-15}$ | $-5.52365 \times 10^{-17}$ | $-5.89345 \times 10^{-15}$ | $-7.92356 \times 10^{-15}$ | $-2.18574 \times 10^{-14}$ |
| AG | $-1.72773 \times 10^{-19}$ | $-2.73816 \times 10^{-19}$ | $5.47376 \times 10^{-18}$ | $8.44363 \times 10^{-18}$ | $-9.53015 \times 10^{-18}$ |

Figure 5:
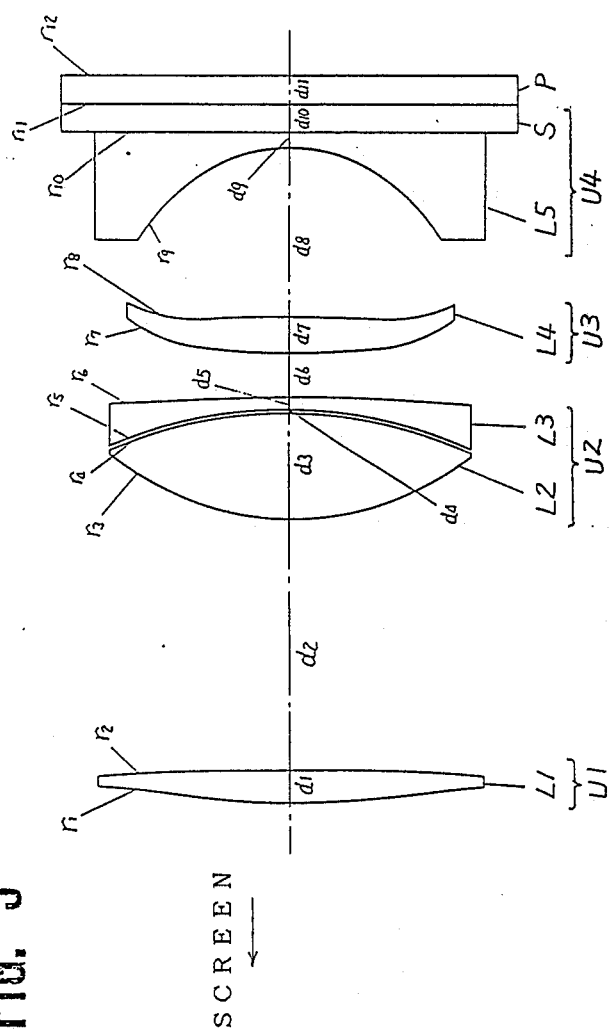
Figure 6:
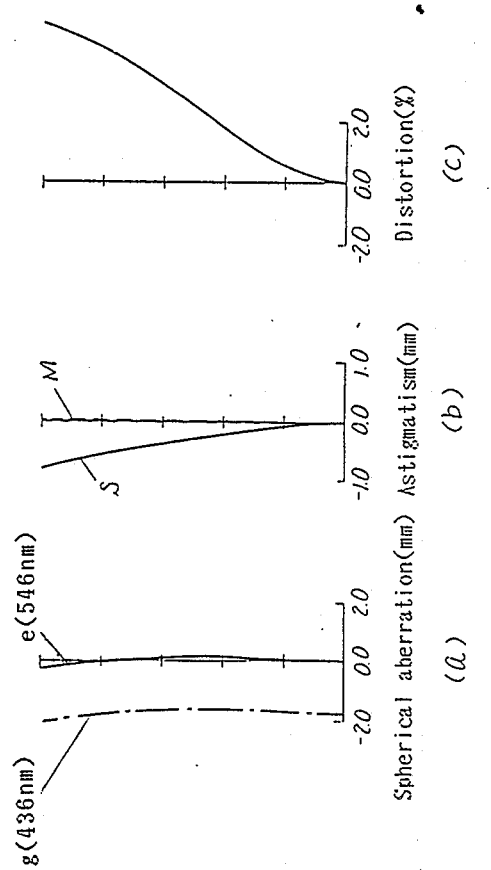
FIGS. 6 through 9 respectively show characteristic curves of the first through fourth embodiments, in each of which (a), (b) and (c) respectively show spherical aberration, astigmatism and distortion.
Figure 7:
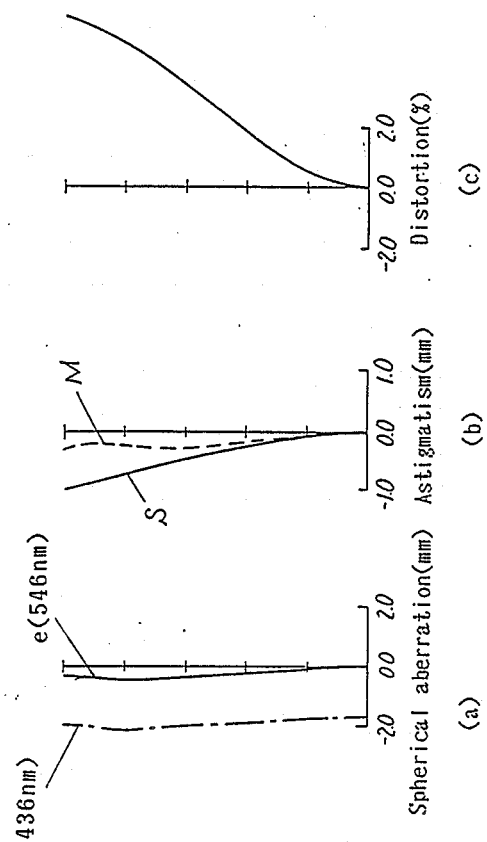
Figure 8:
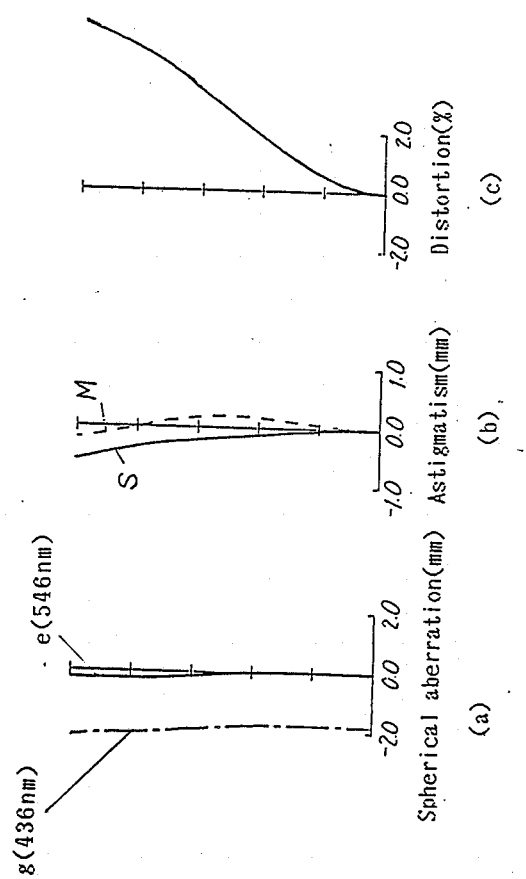
Figure 9:
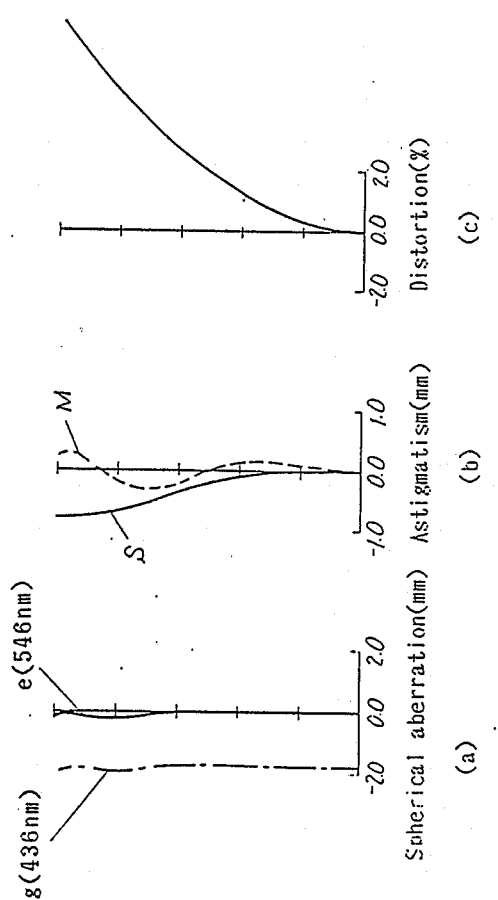

Fourth embodiment (FIG. 5)

Focal length $f = 127.3$, Field angle 47.5°, F1.18,
$f_{2P}\cdot\nu_{2P}/f_{2N}\cdot\nu_{2N} = -0.697$,
$d_{23} = d_6$, $d_{23}/f = 0.122$, $d_{12} = d_2$, $d_{12}/f_1 = 0.183$

| | | | |
|---|---|---|---|
| $r_1 = 233.830$ | $d_1 = 11.32$ | $n_1 = 1.493834$ | $\nu_1 = 56.9$ |
| $r_2 = 9416.980$ | $d_2 = 84.61$ | $n_2 = 1.0$ | |
| $r_3 = 94.529$ | $d_3 = 35.46$ | $n_3 = 1.5818253$ | $\nu_2 = 64.0$ |
| $r_4 = -147.706$ | $d_4 = 0.94$ | $n_4 = 1.0$ | |
| $r_5 = -144.721$ | $d_5 = 4.72$ | $n_5 = 1.624084$ | $\nu_3 = 36.1$ |
| $r_6 = -662.684$ | $d_6 = 15.49$ | $n_6 = 1.0$ | |
| $r_7 = 369.001$ | $d_7 = 11.32$ | $n_7 = 1.493834$ | $\nu_4 = 56.9$ |
| $r_8 = -356.409$ | $d_8 = 56.11$ | $n_8 = 1.0$ | |
| $r_9 = -55.784$ | $d_9 = 4.72$ | $n_9 = 1.518253$ | $\nu_5 = 64.0$ |
| $r_{10} = \infty$ | $d_{10} = 8.90$ | $n_{10} = 1.400000$ | |
| $r_{11} = \infty$ | $d_{11} = 10.40$ | $n_{11} = 1.540000$ | |
| $r_{12} = \infty$ | | | | aspherical surfaces

| | 1st surface | 2nd surface | 7th surface | 8th surface |
|---|---|---|---|---|
| K | $-13.5632$ | $-7.16866 \times 10^{-4}$ | $-1.57644$ | $-132.102$ |
| AD | $-7.51572 \times 10^{-11}$ | $-7.77068 \times 10^{-8}$ | $4.87928 \times 10^{-7}$ | $5.02500 \times 10^{-7}$ |
| AE | $-3.13960 \times 10^{-11}$ | $-6.65768 \times 10^{-12}$ | $-2.90144 \times 10^{-11}$ | $-3.73564 \times 10^{-11}$ |
| AF | $3.85386 \times 10^{-15}$ | $-6.77187 \times 10^{-16}$ | $6.71503 \times 10^{-14}$ | $1.10709 \times 10^{-13}$ |

-continued

Fourth embodiment (FIG. 5)

| | | | | |
|---|---|---|---|---|
| AG | $-5.65770 \times 10^{-19}$ | $-7.56652 \times 10^{-21}$ | $-6.23030 \times 10^{-18}$ | $-1.76059 \times 10^{-17}$ |

Aberration curves of the first through fourth embodiments are respectively shown in FIGS. 6 through 9, which show remarkable aberration correction effects.

What is claimed is:

1. A projection lens for projecting on a screen an enlargement of an image appearing on a cathode ray tube, comprising from the screen end:

a first lens unit of positive optical power having a strongly convex surface facing the screen end;

a second lens unit comprising a biconvex lens element of positive optical power and a lens element of negative optical power having a concave surface facing the screen end;

a third lens unit of positive optical power at an optical axis having a convex surface facing the screen end;

and a fourth lens unit of negative optical power having a concave surface facing the screen end;

said projection lens satisfying the following conditions:

(1) $f_{2P} \cdot \nu_{2P}/f_{2N} \cdot \nu_{2N} < -0.69$ (2) $0.10 < d_{23}/f < 0.15$ where, f: focal length of the overall lens system $f_{2P}$: focal length of the lens element of positive optical power in the second lens unit $f_{2N}$: focal length of the lens element of negative optical power in the second lens unit $\nu_{2P}$: Abbe's number of the lens element of positive optical power in the second lens unit $\nu_{2N}$: Abbe's number of the lens element of negative optical power in the second lens unit $d_{23}$: distance between the second lens unit and the third lens unit.

2. A projection lens according to claim 1, satisfying the following condition:

(3) $d_{12}/f_1 < 0.2$ where, $f_1$: Focal length of the first lens unit $d_{12}$: distance between the first lens unit and the second unit.

3. A projection lens according to claim 1, wherein:

focal length f = 136.9, field angle 45°, F1.3,
$f_{2P} \cdot \nu_{2P}/f_{2N} \cdot \nu_{2N} = -1.09$,
$d_{23} = d_6$, $d_{23}/f = 0.121$, $d_{12} = d_2$, $d_{12}/f_1 = 0.161$

| | | | |
|---|---|---|---|
| $r_1 = 179.293$ | $d_1 = 13.00$ | $n_1 = 1.493834$ | $\nu_1 = 56.9$ |
| $r_2 = 1145.071$ | $d_2 = 69.12$ | $n_2 = 1.0$ | |
| $r_3 = 114.744$ | $d_3 = 27.00$ | $n_3 = 1.5818253$ | $\nu_2 = 64.0$ |
| $r_4 = -190.183$ | $d_4 = 0.65$ | $n_4 = 1.0$ | |
| $r_5 = -259.096$ | $d_5 = 4.80$ | $n_5 = 1.624084$ | $\nu_3 = 36.1$ |
| $r_6 = 329.668$ | $d_6 = 20.00$ | $n_6 = 1.0$ | |
| $r_7 = 129.605$ | $d_7 = 15.00$ | $n_7 = 1.493834$ | $\nu_4 = 56.9$ |
| $r_8 = -1238.692$ | $d_8 = 68.62$ | $n_8 = 1.0$ | |
| $r_9 = -54.366$ | $d_9 = 5.00$ | $n_9 = 1.493834$ | $\nu_5 = 56.9$ |
| $r_{10} = -60.000$ | $d_{10} = 8.95$ | $n_{10} = 1.400000$ | |
| $r_{11} = \infty$ | $d_{11} = 15.00$ | $n_{11} = 1.540000$ | |
| $r_{12} = \infty$ | | | | aspherical surfaces

| | 1st surface | 2nd surface | 7th surface | 8th surface | 9th surface |
|---|---|---|---|---|---|
| K | $-4.09552$ | $219.798$ | $3.52227$ | $-329.552$ | $-0.129981$ |
| AD | $-2.36725 \times 10^{-8}$ | $-4.88877 \times 10^{-8}$ | $7.98589 \times 10^{-8}$ | $3.93128 \times 10^{-7}$ | $-9.55362 \times 10^{-7}$ |
| AE | $-1.86977 \times 10^{-11}$ | $-2.13160 \times 10^{-11}$ | $1.53595 \times 10^{-11}$ | $4.20446 \times 10^{-11}$ | $3.26460 \times 10^{-10}$ |
| AF | $-1.76004 \times 10^{-15}$ | $-2.61011 \times 10^{-16}$ | $-6.46760 \times 10^{-15}$ | $-6.53621 \times 10^{-15}$ | $-2.31463 \times 10^{-14}$ |
| AG | $-2.26308 \times 10^{-19}$ | $-2.98844 \times 10^{-19}$ | $5.80399 \times 10^{-18}$ | $7.46446 \times 10^{-18}$ | $-7.77418 \times 10^{-18}$ | where, $r_1, r_2, r_3 \ldots$ represent radii of curvature of surfaces of lens elements disposed from the screen end; $d_1, d_2, d_3 \ldots$ represent center thicknesses of the lens elements and distances therebetween; $n_1, n_2, n_3 \ldots$ represent refractive indices at a wave length $\lambda = 546$ nm of the lens elements; $\nu_1, \nu_2, \nu_3 \ldots$ represent Abbe's number at the wave length $\lambda = 546$ nm of the lens elements, wherein the shape of each aspheric surface in a Cartesian coordinate system with direction of optical axis bring X axis (Y axis is peripendicular to. X axis), is an aspheric surface of rotating symmetry expressed by the following formula:

$$X = \frac{CP^2}{1 + \sqrt{1 - (1 + K)C^2 P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, and AD, AE, AF, AG are higher dimension constants.

4. A projection lens according to claim 1, wherein:

focal length f = 135.00, field angle 45°, F1.3,
$f_{2P} \cdot \nu_{2P}/f_{2N} \cdot \nu_{2N} = -1.21$,
$d_{23} = d_6$, $d_{23}/f = 0.121$, $d_{12} = d_2$, $d_{12}/f_1 = 0.133$

| | | | |
|---|---|---|---|
| $r_1 = 142.525$ | $d_1 = 13.20$ | $n_1 = 1.493834$ | $\nu_1 = 56.9$ |
| $r_2 = 434.415$ | $d_2 = 56.25$ | $n_2 = 1.0$ | |

-continued

| | | | |
|---|---|---|---|
| $r_3 = 131.980$ | $d_3 = 26.50$ | $n_3 = 1.5818253$ | $\nu_2 = 64.0$ |
| $r_4 = -177.338$ | $d_4 = 0.50$ | $n_4 = 1.0$ | |
| $r_5 = -169.475$ | $d_5 = 4.80$ | $n_5 = 1.624084$ | $\nu_3 = 36.1$ |
| $r_6 = 726.239$ | $d_6 = 16.30$ | $n_6 = 1.0$ | |
| $r_7 = 182.769$ | $d_7 = 16.30$ | $n_7 = 1.493834$ | $\nu_4 = 56.9$ |
| $r_8 = -215.972$ | $d_8 = 75.01$ | $n_8 = 1.0$ | |
| $r_9 = -52.111$ | $d_9 = 5.00$ | $n_9 = 1.493834$ | $\nu_5 = 56.9$ |
| $r_{10} = -61.111$ | $d_{10} = 9.00$ | $n_{10} = 1.400000$ | |
| $r_{11} = \infty$ | $d_{11} = 10.40$ | $n_{11} = 1.540000$ | |
| $r_{12} = \infty$ | | | |

| aspherical surfaces | | | | | |
|---|---|---|---|---|---|
| | 1st surface | 2nd surface | 7th surface | 8th surface | 9th surface |
| K | $-6.89418 \times 10^{-1}$ | 0.0 | 3.34565 | 0.0 | $-0.521866$ |
| AD | $4.69642 \times 10^{-8}$ | $1.04113 \times 10^{-7}$ | $4.28321 \times 10^{-8}$ | $1.50827 \times 10^{-7}$ | $-1.37984 \times 10^{-6}$ |
| AE | $-3.39527 \times 10^{-12}$ | $8.82672 \times 10^{-12}$ | $5.99839 \times 10^{-11}$ | $7.09977 \times 10^{-11}$ | $4.65791 \times 10^{-10}$ |
| AF | $4.58348 \times 10^{-15}$ | $1.89312 \times 10^{-15}$ | $2.13308 \times 10^{-15}$ | $-9.03071 \times 10^{-15}$ | $-1.31671 \times 10^{-13}$ |
| AG | $1.88991 \times 10^{-19}$ | $4.80433 \times 10^{-19}$ | $-4.03161 \times 10^{-18}$ | $-3.06209 \times 10^{-18}$ | $4.80722 \times 10^{-18}$ | where, $r_1$, $r_2$, $r_3$ . . . represent radii of curvature of surfaces of lens elements disposed from the screen end; $d_1$, $d_2$, $d_3$ . . . represent center thicknesses of the lens elements and distances therebetween; $n_1$, $n_2$, $n_3$ . . . represent refractive indices at a wave length $\lambda=546$ nm of the lens elements; $\nu_1$, $\nu_2$, $\nu_3$ . . . represent Abbe's number at the wave length $\lambda=546$ nm of the lens elements, wherein the shape of each aspheric surface in a Cartesian coordinate system with direction of optical axis being X axis (Y axis is perpendicular to X axis), is an aspheric surface of rotating symmetry expressed by the following formula:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, and AD, AE, AF, AG are higher dimension constants.

5. A projection lens according to claim 1, wherein:

where, $r_1$, $r_2$, $r_3$ . . . represent radii of curvature of surfaces of lens elements disposed from the screen end; $d_1$, $d_2$, $d_3$ . . . represent center thicknesses of the lens elements and distances therebetween; $n_1$, $n_2$, $n_3$ . . . represent refractive indices at a wave length $\lambda=546$ nm of the lens elements; $\nu_1$, $\nu_2$, $\nu_3$ . . . represent Abbe's number at the wave length $\lambda=546$ nm of the lens elements, wherein the shape of each aspheric surface in a Cartesian coordinate system with direction of optical axis being X axis (Y axis is perpendicular to X axis), is an aspheric surface of rotating symmetry expressed by the following formula:

$$X = \frac{CP^2}{1 + \sqrt{1 - (1 + K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, and AD, AE, AF, AG are higher dimension constants.

6. A projection lens according to claim 1, wherein:

| focal length f = 127.3, field angle 47.5°, F1.18, $f_{2P} \cdot \nu_{2P}/f_{2N} \cdot \nu_{2N} = -0.697$ $d_{23} = d_6$, $d_{23}/f = 0.122$, $d_{12} = d_2$, $d_{12}/f_1 = 0.183$ | | | |
|---|---|---|---|
| $r_1 = 233.830$ | $d_1 = 11.32$ | $n_1 = 1.493834$ | $\nu_1 = 56.9$ |
| $r_2 = -9416.980$ | $d_2 = 84.61$ | $n_2 = 1.0$ | |
| $r_3 = 94.529$ | $d_3 = 35.46$ | $n_3 = 1.5818253$ | $\nu_2 = 64.0$ |
| $r_4 = -147.706$ | $d_4 = 0.94$ | $n_4 = 1.0$ | |
| $r_5 = -144.721$ | $d_5 = 4.72$ | $n_5 = 1.624084$ | $\nu_3 = 36.1$ |
| $r_6 = -662.684$ | $d_6 = 15.49$ | $n_6 = 1.0$ | |
| $r_7 = 369.001$ | $d_7 = 11.32$ | $n_7 = 1.493834$ | $\nu_4 = 56.9$ |
| $r_8 = -356.409$ | $d_8 = 56.11$ | $n_8 = 1.0$ | |
| $r_9 = -55.784$ | $d_9 = 4.72$ | $n_9 = 1.518253$ | $\nu_5 = 64.0$ |
| $r_{10} = \infty$ | $d_{10} = 8.90$ | $n_{10} = 1.400000$ | |
| $r_{11} = \infty$ | $d_{11} = 10.40$ | $n_{11} = 1.540000$ | |
| $r_{12} = \infty$ | | | |

| aspherical surfaces | | | | |
|---|---|---|---|---|
| | 1st surface | 2nd surface | 7th surface | 8th surface |
| K | $-13.5632$ | $-7.16866 \times 10^4$ | $-1.57644$ | $-132.102$ |
| AD | $-7.51572 \times 10^{-11}$ | $-7.77068 \times 10^{-8}$ | $4.87928 \times 10^{-7}$ | $5.02500 \times 10^{-7}$ |
| AE | $-3.13960 \times 10^{-11}$ | $-6.65768 \times 10^{-12}$ | $-2.90144 \times 10^{-11}$ | $-3.73564 \times 10^{-11}$ |
| AF | $3.85386 \times 10^{-15}$ | $-6.77187 \times 10^{-16}$ | $6.71503 \times 10^{-14}$ | $1.10709 \times 10^{-13}$ |
| AG | $-5.65770 \times 10^{-19}$ | $-7.56652 \times 10^{-21}$ | $-6.23030 \times 10^{-18}$ | $-1.76059 \times 10^{-17}$ | focal length f = 135.8 field angle 45°, F1.3,
$f_{2P} \cdot \nu_{2P}/f_{2N} \cdot \nu_{2N} = -1.04$,
$d_{23} = d_6$, $d_{23}/f = 0.147$, $d_{12} = d_2$, $d_{12}/f_1 = 0.151$

| | | | |
|---|---|---|---|
| $r_1 = 182.566$ | $d_1 = 13.00$ | $n_1 = 1.493834$ | $\nu_1 = 56.9$ |
| $r_2 = 1150.616$ | $d_2 = 65.98$ | $n_2 = 1.0$ | |
| $r_3 = 119.259$ | $d_3 = 27.00$ | $n_3 = 1.518253$ | $\nu_2 = 64.0$ |
| $r_4 = -188.291$ | $d_4 = 0.63$ | $n_4 = 1.0$ | |
| $r_5 = -263.246$ | $d_5 = 4.80$ | $n_5 = 1.624084$ | $\nu_3 = 36.1$ |
| $r_6 = 349.810$ | $d_6 = 20.0$ | $n_6 = 1.0$ | |
| $r_7 = 1.31845$ $d_7 = 15.30$ | 4.34700 $7 = 1.493834$ | 3.53853 $4 = 56.9$ | |
| $r_8 = -1148.490$ | $d_8 = 69.25$ | $n_8 = 1.0$ | |
| $r_9 = -55.638$ | $d_9 = 5.00$ | $n_9 = 1.493834$ | $\nu_5 = 56.9$ |
| $r_{10} = 5.47376$  60.000 | $d_{10} = 11.76$ | $n_{10} = 1.400000$ | |
| $r_{11} = \infty$ | $d_{11} = 10.40$ | $n_{11} = 1.540000$ | |
| $r_{12} = \infty$ | | | |

| | | | aspherical surface | | |
|---|---|---|---|---|---|
| | 1st surface | 2nd surface | 7th surface | 8th surface | 9th surface |
| K | $-5.08789$ | $195.225$ | $3.54090$ | $-290.282$ | $-9.03765 \times 10^{-2}$ |
| AD | $-2.82412 \times 10^{-8}$ | $-6.67435 \times 10^{-8}$ | $7.19186 \times 10^{-8}$ | $3.8104 \times 10^{-7}$ | $-1.09203 \times 10^{-6}$ |
| AE | $-1.91102 \times 10^{-11}$ | $-1.86886 \times 10^{-11}$ | $1.31845 \times 10^{-11}$ | $4.34700 \times 10^{-11}$ | $3.53853 \times 10^{-10}$ |
| AF | $-1.86590 \times 10^{-15}$ | $-5.52365 \times 10^{-17}$ | $-5.89345 \times 10^{-15}$ | $-7.92356 \times 10^{-15}$ | $-2.18574 \times 10^{-14}$ |
| AG | $-1.72773 \times 10^{-19}$ | $-2.73816 \times 10^{-19}$ | $5.47376 \times 10^{-18}$ | $8.44363 \times 10^{-18}$ | $-9.53015 \times 10^{-18}$ | where, $r_1$, $r_2$, $r_3$ . . . represent radii of curvatute of surfaces of lens elements disposed from the screen end; $d_1$, $d_2$, $d_3$ . . . represent center thicknesses of the lens elements and distances therebetween; $n_1$, $n_2$, $n_3$ . . . represent refractive indices at a wave length $\lambda = 546$ nm of the lens elements; $\nu_1$, $\nu_2$, $\nu_3$ . . . represent Abbe's number at the wave length $\lambda = 546$ nm of the lens elements, wherein the shape of each aspheric surface in a Cartesian coordinate system with direction of optical axis being X axis (Y axis is perpendicular to X axis), is an aspheric surface of rotating symmetry expressed by the following formula:

$$X = \frac{CP^2}{1 + \sqrt{1 - (1+K)C^2P^2}} + AD \cdot P^4 + AE \cdot P^6 + AF \cdot P^8 + AG \cdot P^{10}$$

$$P = \sqrt{Y^2 + Z^2}$$

where, C is a vertex curvature, K is a conic constant, and AD, AE, AF, AG are higher dimension constants.

7. A projection lens according to claim 1, wherein the first and third lens units are made of a plastic material, and the second lens unit is made of a glass material.

8. A projection lens for projecting on a screen an enlargement of an image appearing on a cathode ray tube, comprising from the screen end:
a first lens unit of positive optical power having a strong convex surface facing the screen end and having at least one aspherical surface to correct aberration depending on an aperture of the lens;
a second lens unit comprising a biconvex lens element of positive optical power and a lens element of negative optical power having a concave surface facing the screen end to correct spherical aberration and chromatic aberration;
a third lens unit of positive optical power at an optical axis having a convex surface facing the screen end and having at least one aspherical surface to correct coma and astigmatism; and
a fourth lens unit of negative optical power having a concave surface facing the screen end to correct aberration depending on a view angle;
said projection lens satisfying the following conditions:
(1) $f_{2P} \cdot \nu_{2P}/f_{2N} \cdot \nu_{2N} < -0.69$
(2) $0.10 < d_{23}/f < 0.15$
where,
f: focal length of the overall lens system
$f_{2P}$: focal strength of the lens element of positive optical power in the second lens unit
$f_{2N}$: focal length of the lens element of negative optical power in the second lens unit
$\nu_{2P}$: Abbe's number of the lens element of positive optical power in the second lens unit
$\nu_{2N}$: Abbe's number of the lens element of negative optical power in the second lens unit
$d_{23}$: distance between the second lens unit and the third lens unit.

* * * * *